United States Patent
Lin (10) Patent No.: US 11,874,586 B2
(45) Date of Patent: Jan. 16, 2024

(54) ROTATING MECHANISM FOR ORIENTATING CAMERA IN MULTIPLE DIRECTIONS WITH SINGLE MOTOR

(71) Applicant: Alpha Networks Inc., Hsinchu (TW)

(72) Inventor: Tzu-Chih Lin, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 31 days.

(21) Appl. No.: 17/677,290

(22) Filed: Feb. 22, 2022

(65) Prior Publication Data

US 2023/0010779 A1    Jan. 12, 2023

(30) Foreign Application Priority Data

Jul. 7, 2021 (TW) .................................. 110124939

(51) Int. Cl.
| | |
|---|---|
| *G03B 17/56* | (2021.01) |
| *F16M 11/10* | (2006.01) |
| *F16M 13/02* | (2006.01) |
| *F16M 11/20* | (2006.01) |
| *F16M 11/18* | (2006.01) |
| *F16D 27/118* | (2006.01) |

(52) U.S. Cl.
CPC .......... *G03B 17/561* (2013.01); *F16D 27/118* (2013.01); *F16M 11/10* (2013.01); *F16M 11/18* (2013.01); *F16M 11/2014* (2013.01); *F16M 13/022* (2013.01); *G03B 17/56* (2013.01)

(58) Field of Classification Search
CPC ..... G03B 17/56; G03B 17/561; F16D 27/118; F16D 11/10; F16D 11/18; F16D 11/2014; F16M 13/022

USPC .......................................................... 396/428
See application file for complete search history.

(56) References Cited

U.S. PATENT DOCUMENTS

| | | | |
|---|---|---|---|
| 7,626,633 B2 | 12/2009 | Okamoto et al. | |
| 9,690,184 B1 * | 6/2017 | Kobayashi | ................ H02P 7/03 |

(Continued)

FOREIGN PATENT DOCUMENTS

| | | | |
|---|---|---|---|
| CN | 201198948 Y | * 2/2009 | |
| CN | 106231168 A | * 12/2016 | ............. F16M 11/12 |

(Continued)

OTHER PUBLICATIONS

TW OA dated Apr. 12, 2022.

*Primary Examiner* — Stephanie E Bloss
*Assistant Examiner* — Kevin C Butler
(74) *Attorney, Agent, or Firm* — WPAT, P.C (57) ABSTRACT

An image-capturing device includes a camera and a rotating mechanism for orienting the camera in multiple directions. The rotating mechanism includes a motor; a driving gear; a first transmission module including a first input gear, which is selectively engaged with and transmitted to rotate by the driving gear at a first position, and transmitting the camera to rotate in a first direction with rotation of the first input gear; a second transmission module including a second input gear, which is selectively engaged with and transmitted to rotate by the driving gear at a second position, and transmitting the camera to rotate in a second direction with rotation of the second input gear; and a clutch mechanism including a clutch device for driving the driving gear to switch between the first position and the second position. The clutch device includes a solenoid.

11 Claims, 6 Drawing Sheets

(56) References Cited

U.S. PATENT DOCUMENTS

| | | | | |
|---|---|---|---|---|
| 10,812,698 | B1* | 10/2020 | Zhou | H04M 1/0264 |
| 11,343,431 | B2* | 5/2022 | Tonkin | H04N 23/634 |
| 2004/0161230 | A1* | 8/2004 | Hosokawa | G03B 15/05 |
| | | | | 396/177 |
| 2010/0051774 | A1* | 3/2010 | Shi | F16M 11/18 |
| | | | | 248/349.1 |
| 2016/0070154 | A1* | 3/2016 | Lai | G03B 17/561 |
| | | | | 396/428 |
| 2023/0010779 | A1* | 1/2023 | Lin | G03B 17/561 |

FOREIGN PATENT DOCUMENTS

| | | | | |
|---|---|---|---|---|
| CN | 106231168 | | 5/2019 | |
| CN | 110124939 | A * | 8/2019 | |
| CN | 113810526 | A * | 12/2021 | |
| DE | 102009039433 | A1 * | 3/2010 | F16M 11/10 |
| FR | 2883990 | A1 * | 10/2006 | G03B 15/00 |
| JP | 2004251983 | A * | 9/2004 | G03B 15/05 |
| JP | 4697999 | B2 * | 6/2011 | G03B 21/10 |
| JP | 2015519612 | A * | 7/2015 | G03B 17/56 |
| TW | M277851 | U * | 10/2005 | F16M 11/00 |
| TW | M482022 | U * | 7/2014 | F16M 11/12 |
| TW | I547665 | | 9/2016 | |
| TW | I547665 | B * | 9/2016 | G03B 17/561 |
| TW | 202303028 | A * | 1/2023 | F16D 27/118 |

\* cited by examiner

ROTATING MECHANISM FOR ORIENTATING CAMERA IN MULTIPLE DIRECTIONS WITH SINGLE MOTOR

FIELD OF THE INVENTION

The present invention relates to a rotating mechanism, and more particularly to a rotating mechanism for orientating a camera in multiple directions with a single motor. The present invention also relates to an image-capturing device, in which a camera can be orientated to capture images in a variety of fields with a single motor.

BACKGROUND OF THE INVENTION

In order to maximize coverage of a camera at a fixed location, it is desirable that the camera is rotatable, for example, horizontally and/or vertically, to have variable orientations. The function of changing fields of view is particularly useful for a surveillance camera or a web camera.

Conventionally, two sets of rotating mechanisms are equipped to drive horizontal rotation and vertical rotation of the camera, respectively. In other words, two motors would be required for rotating the camera in two different and non-parallel directions. Aside from the cost of additional motors, it is apparent that there is a higher risk of failure in rotation by way of a two-motor rotating system than a one-motor rotating system in consideration of probability of failure of individual motors.

SUMMARY OF THE INVENTION

Therefore, the present invention provides a rotating mechanism, which uses a single motor to drive rotation of a camera in different and non-parallel directions.

The present invention also provides an image-capturing device, which includes a rotating mechanism, which uses a single motor to drive rotation of a camera of the image-capturing device in different and non-parallel directions.

In an aspect of the present invention, a rotating mechanism includes a motor; a driving gear coupled to and driven by the motor via a transmitting shaft; a first transmission module including a first input gear, which is selectively engaged with and transmitted by the driving gear to rotate when the driving gear is disposed at a first position, and transmitting the object to rotate in a first direction with rotation of the first input gear; a second transmission module including a second input gear, which is selectively engaged with and transmitted by the driving gear to rotate when the driving gear is disposed at a second position, and transmitting the object to rotate in a second direction with rotation of the second input gear; and a clutch mechanism including a clutch device for driving the driving gear to switch between the first position and the second position, the clutch device including a solenoid.

In another aspect of the present invention, an image-capturing device includes a camera and the above-described rotating mechanism for orienting the camera in multiple directions.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
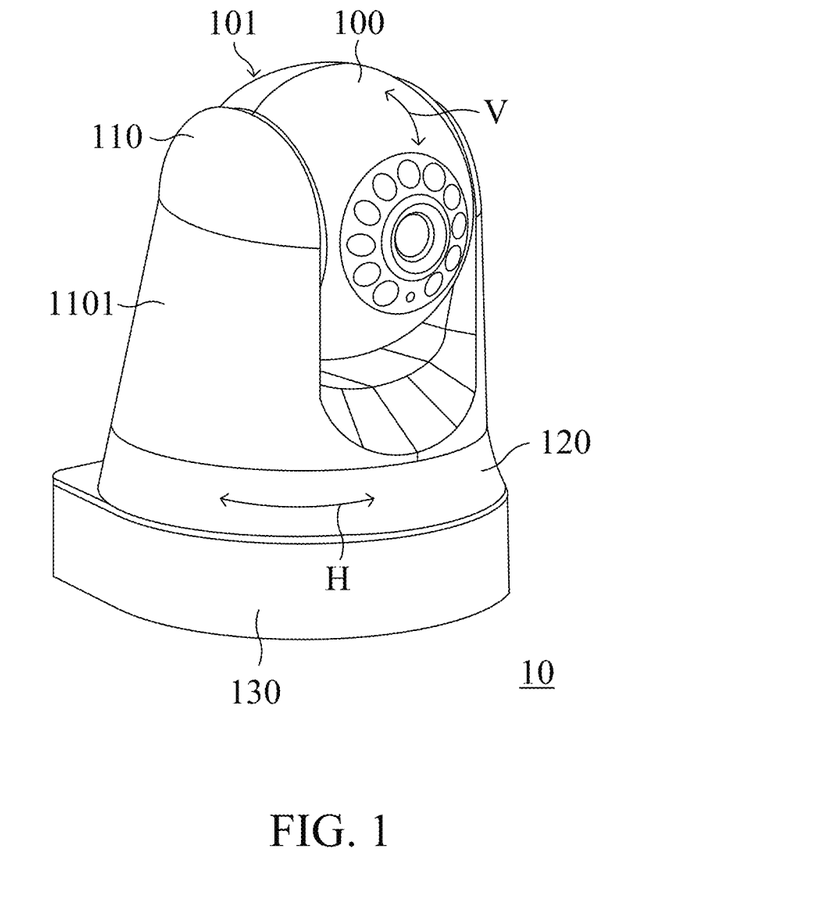
FIG. 1 is a schematic diagram illustrating an image-capturing device according to an embodiment of the present invention.

Please refer to FIG. 1, which schematically illustrates an image-capturing device 10, which includes a camera 100 and a rotating mechanism 101. The rotating mechanism 101 is mechanically combined with the camera 100 to drive the camera 100 to rotate in different and non-parallel directions, thereby orientating the camera 100 in a variety of fields. It is to be noted that the rotation of the camera in different and non-parallel directions substantially means that the camera rotates or pivots about different and non-parallel axes. For example, the rotation of the camera in a vertical direction means that the camera rotates about a horizontal line, while the rotation of the camera in a horizontal direction means that the camera rotates about a vertical line. The rotating mechanism 101 in this embodiment includes a supporting member 110, a seat 120 and a base 130, which cooperatively form a housing structure of the image-capturing device 10. The rotating mechanism further includes a driving and transmission mechanism for optionally and selectively rotating the camera 100. The driving and transmission mechanism is accommodated in the above-described housing structure, and will be described in detail later.

For assembling, the camera 100 is first mounted onto the supporting member 110. For example, the supporting member 110 is implemented with a hollow or recessed stand having therein a space for accommodating the camera 100. Opposite sides of the camera 100 engage with opposite posts 1101 of the stand 110 with any suitable means so that the camera 100 is rotatable in a first direction, e.g., vertical direction V, relative to the stand 110. Then the stand 110 is mounted onto the seat 120 to form a camera assembly, and the camera assembly is further rotatably mounted onto the base 130 to complete the image-capturing device 10. In this embodiment, the seat 120 is rotatable in a second direction, e.g., horizontal direction H, relative to the base 130 by way of any suitable coupling means.

Figure 2A:
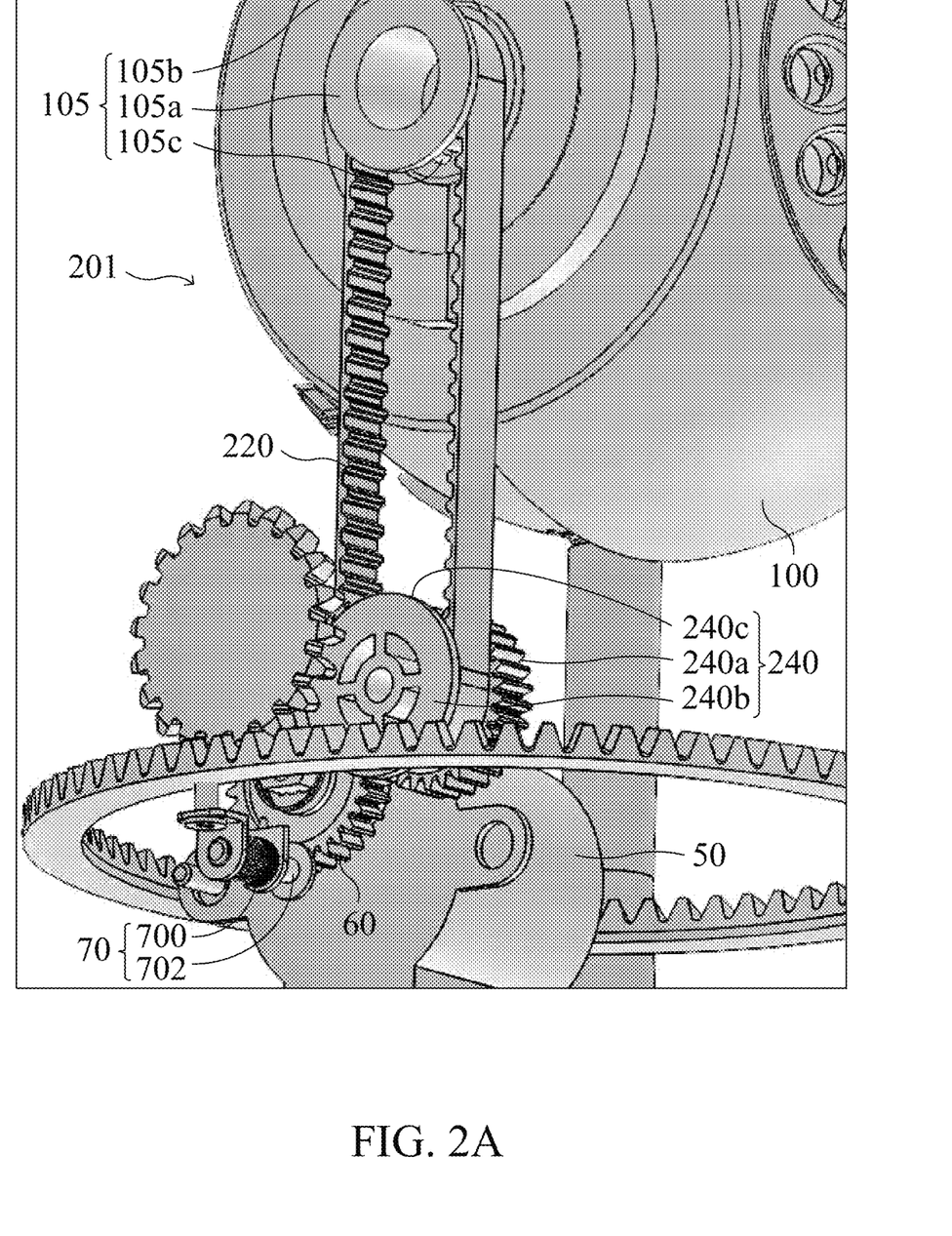
FIG. 2A is a schematic diagram illustrating a portion of a rotating mechanism according to an embodiment of the present invention, wherein the rotating mechanism is under a configuration for enabling a rotation in a specified direction.
Figure 2B:
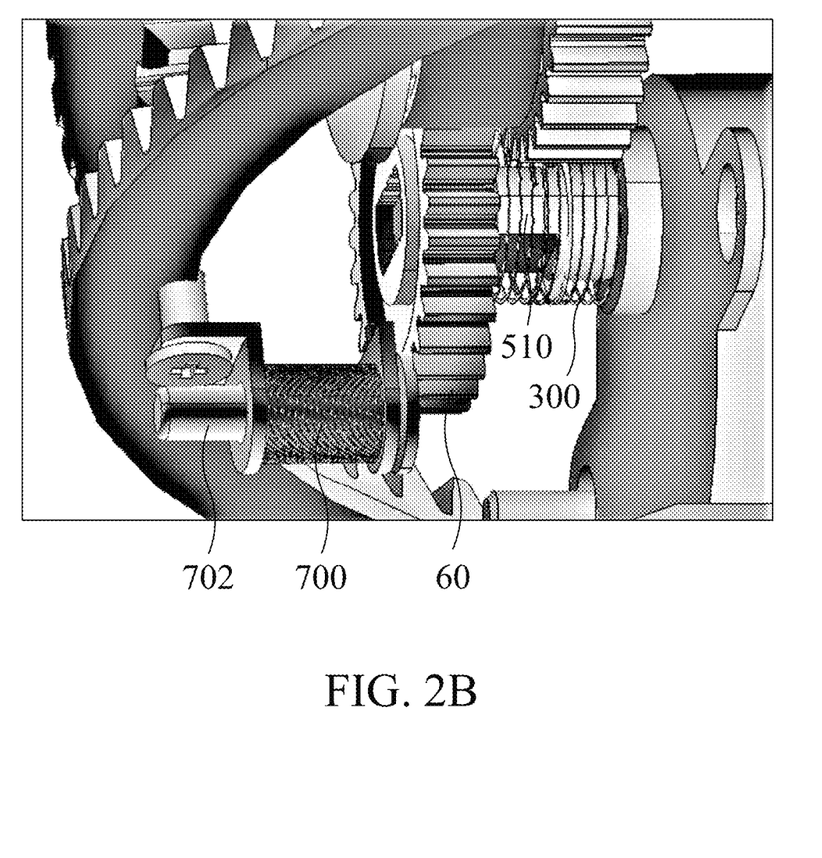
FIG. 2B is a schematic diagram illustrating another portion of the rotating mechanism of FIG. 2A, wherein the rotating mechanism is under a configuration for enabling a rotation in another specified direction.
Figure 2C:
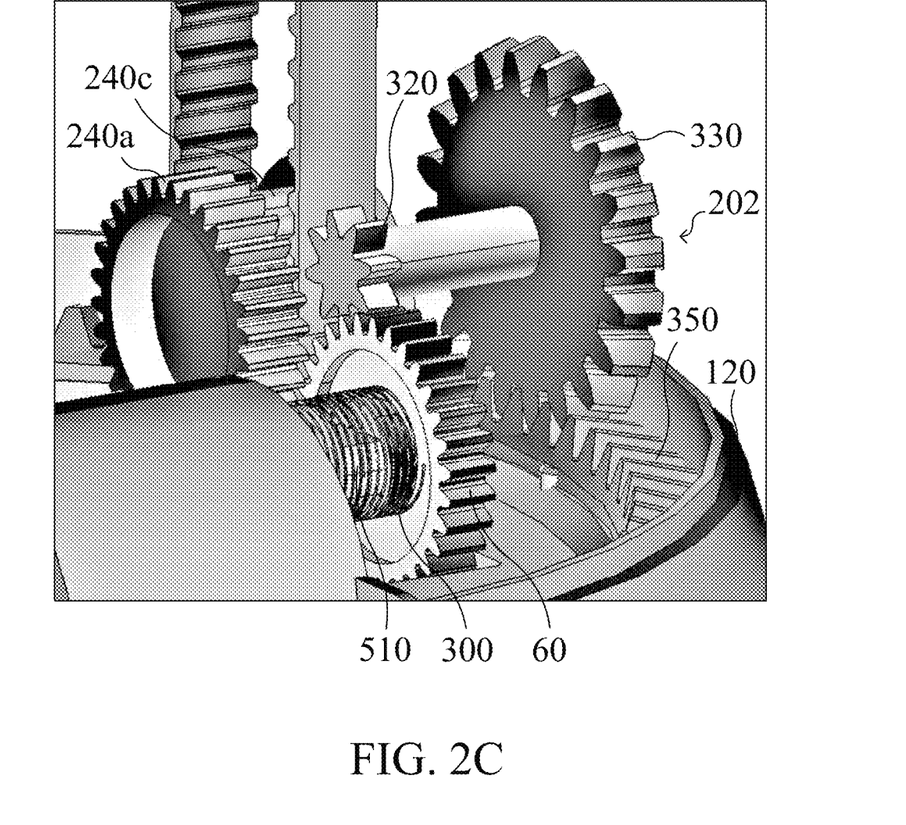
FIG. 2C is a schematic diagram illustrating a further portion of the rotating mechanism of FIG. 2A.

FIGS. 2A-2C schematically illustrate driving and transmission mechanisms of the image-capturing device according to an embodiment of the present invention. The driving and transmission mechanisms are accommodated in the housing structure, i.e., the supporting member 110, the seat 120 and/or the base 130, and function for orientating the camera 100 properly.

The driving and transmission mechanism of the rotating mechanism 101 includes a driving motor 50, a driving gear 60, a clutch device 70, a first transmitting module 201, and a second transmitting module 202. Depending on a configuration of the clutch device 70, one of the first transmitting module 201 and the second transmitting module 202 is selectively driven to rotate by the driving motor 50 together with the driving gear 60. When the camera 100 is to be rotated in the vertical direction V, the clutch device 70 is adjusted into a first configuration relative to the driving gear 60, i.e., the clutch device 70 sustains against the left side of the driving gear 60 as shown in FIG. 2A, so that the driving gear 60 is pushed to engage with the first transmitting module 201. On the other hand, when the camera 100 is to be rotated in the horizontal direction H, the clutch device 70 is adjusted into a second configuration relative to the driving gear 60, i.e., the clutch device 70 releases the driving gear 60 as shown in FIG. 2B, so that the driving gear 60 becomes engaged with the second transmitting module 202 as shown in FIG. 2C. Details of the configuration change of the clutch device 70 will be described later. Subsequently, while the driving motor 50 is controlled to drive the driving gear 60 to rotate via a transmitting shaft 510 (FIG. 2A), the driving gear 60 drives the first transmitting module 201 or second transmitting module 202, which is engaged therewith, to transmit the camera 100 to rotate in the corresponding vertical or horizontal direction.

Referring to FIG. 2A again, the first transmission module 201 includes a timing belt 220 and two timing belt pulleys 105 and 240. The two timing belt pulleys 105 and 240 engage with the timing belt 220 at opposite ends, respectively. The timing belt pulley 240 includes gears 240a and 240c, which are coupled to each other, and a blocker 240b disposed next to the gear 240c and integrated with the gears 240a and 240c. The timing belt 220 is confined between the gear 240a and the blocker 240b and engages with the gear 240c. The timing belt pulley 105 includes blockers 105a and 105b and a gear 105c disposed between and integrated with the blockers 105a and 105b. The timing belt 220 is confined between the blockers 105a and 105b and engages with the gear 105c. Furthermore, the blocker 105b is integrated with the camera 100, and the blocker 105a is rotatably coupled to one of the posts 1101 of the stand 110 shown in FIG. 1.

Next, the configuration change of the clutch device 70 is described. In this embodiment, the clutch device 70 includes a solenoid 700 and a push rod 702 movably disposed inside the solenoid 700. When the solenoid 700 is actuated, the push rod 702 is moved toward the driving gear 60 and pushes the driving gear 60 to engage with the gear 240a of the timing belt pulley 240 of the first transmitting module 201, as shown in FIG. 2A, the clutch device 70 is defined to be in the first configuration. Under this circumstance, when the driving motor 50 drives the driving gear 60 to rotate via a shaft 510 coupled therebetween (FIG. 2B), the rotation of the driving gear 60 transmits the input gear 240a to rotate, and due to the above-described linkage arrangement, the gear 240c of the timing belt pulley 240, the timing belt 220, and the gear 105c of the timing belt pulley 105 are transmitted to rotate. Since the blocker 105b is integrated with both the gear 105c and the camera 100 as described above, the camera 100 can rotate with the driving gear 60 via the first transmitting module 201. Furthermore, since the blocker 105a is integrated with the blocker 105b and rotatably coupled to the post 1101 of the stand 110 as mentioned above, the camera 100 can rotate relative to the stand 110 in the vertical direction V.

It is to be noted that the expression "integrated with" used herein indicates a "securely connected and moving/rotating together with" state, which can be achieved by any suitable coupling means known to or developed by those skilled in the art.

Since it is necessary for the driving gear 60 to keep on smoothly rotating while working with the clutch device 70 in the first configuration, the interface between the push rod 702 and the driving gear 60 should be made slippery enough, i.e., little friction. Therefore, it is desirably to provide fabricating means, e.g., bearing balls (not shown), to the interface to facilitate smooth rotation of the driving gear 60 relative to the push rod 702.

On the other hand, when the solenoid 700 stops working, the push rod 702 is retrieved from sustaining the driving gear 60, as shown in FIG. 2B, and the clutch device 70 is defined to be in the second configuration. The driving gear 60, once released by the push rod 702 of the clutch device 70, also disengages from the gear 240a of the timing belt pulley 240 of the first transmitting module 201, and instead, engages with the second transmitting module 202. The second transmitting module 202 in this embodiment includes a wire spring 300 sleeved around a transmitting shaft 510 of the motor 50, via which the motor 50 drives the driving gear 60 to rotate, and having one end in contact with the driving gear 60. Alternatively, a leaf spring attached to the transmitting shaft may also be used to achieve the similar function. The second transmitting module 202 further includes gears 320 and 330 and timing rack 350. The gears 320 and 330 are coaxially connected with each other. The timing rack 350 is mounted in the seat 120, and combined with the gear 330 to form a bevel gear set. When the push rod 702 of the clutch device 70 sustains against the driving gear 60, the driving gear 60 compresses the spring 300. Subsequently, when the push rod 702 of the clutch device 70 releases the driving gear 60, the driving gear 60 is pushed back by the spring 300 to engage with the gear 320. The spring 300 can thus be considered as a part of the clutch mechanism. While the driving motor 50 is controlled to drive the driving gear 60 to rotate via the transmitting shaft 510, the driving gear 60 drives the input gear 320, which is engaged therewith, to rotate. The gear 330 thus synchronously rotates with the gear 320, and transmit transmits the action of the bevel gear set, thereby transmitting rotation of the seat 120. With the rotation of the seat 120, the camera 100 rotates in the horizontal direction as well.

It is understood from the above descriptions that by way of cooperation of the clutch device 70 and the spring 300 to dispose the driving gear 60 at different locations, the driving gear 60 may engage with either the first transmitting module 201 or the second transmitting module 202. Accordingly, the camera 100 can be selectively rotated in either the vertical direction or the horizontal direction by a single motor 50.

It is to be noted that, although the driving gear 60 is directly driven by the motor 50 via the transmitting shaft 510, any other suitable linking arrangement between the motor 50 and the driving gear 60 may also be used depending on practical requirements.

It is also to be noted that, although the push rod 702 is used to push the driving gear 60 and the spring 300 directly in the above embodiment, any other suitable mechanism may also be used to function as the clutch device 70 to change the positions of the driving gear 60. For example, a magnetic force generated by magnetic means such as another solenoid or an electromagnet can be used to move the driving gear 60 back in lieu of the spring 300.

Figure 3A:
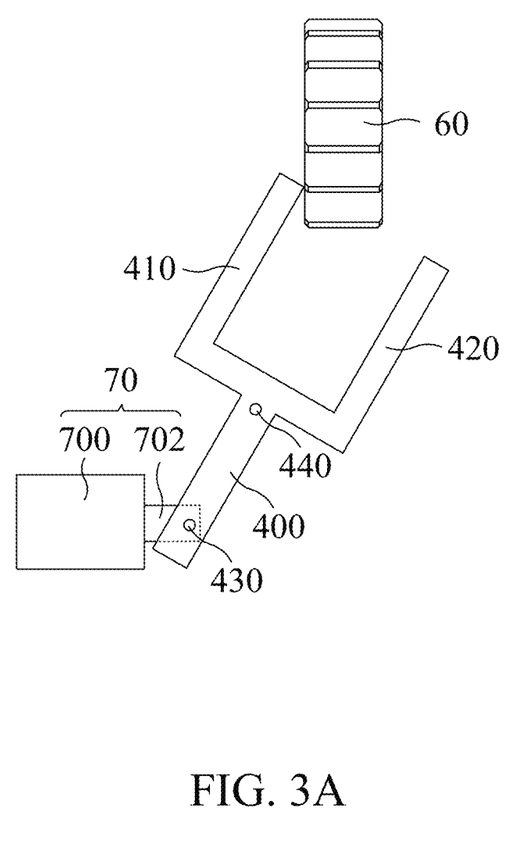
FIG. 3A is a scheme illustrating a configuration of a rotating mechanism according to another embodiment of the present invention for enabling a rotation in a specified direction.
Figure 3B:
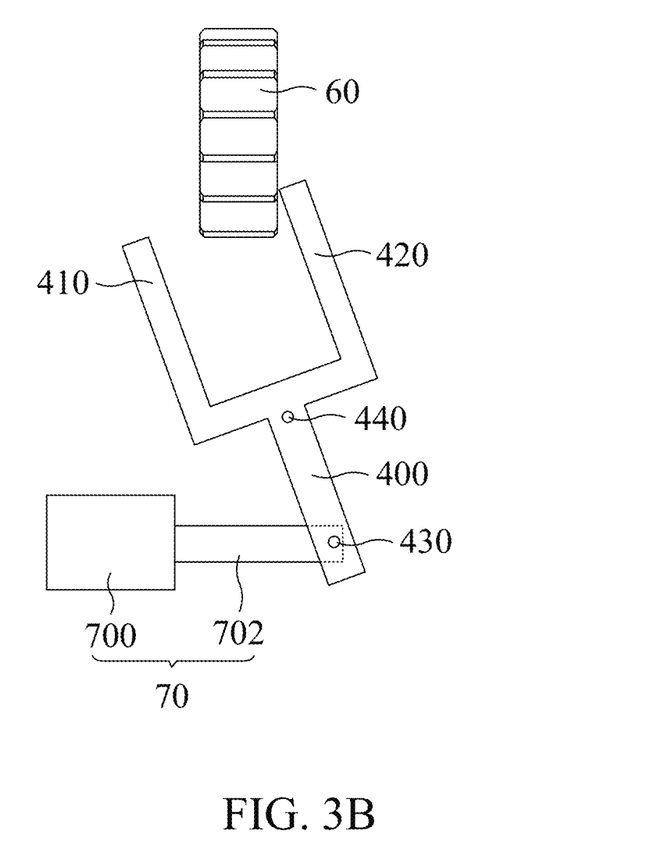
FIG. 3B is a scheme illustrating another configuration of the rotating mechanism of FIG. 3A for enabling a rotation in another specified direction.

FIGS. 3A and 3B schematically illustrate different configurations of the rotating mechanism according to another embodiment of the present invention for rotating the camera in the first direction and the second direction, respectively. In this embodiment, a linkage mechanism is disposed between the push rod 702 and the driving gear 60, and pulled or pushed by the push rod 702 to change the positions of the driving gear 60. The linkage mechanism includes a main rod 400, two branch rods 410 and 420 connected to one end of the main rod 400, and a fulcrum 440 fixed at a suitable position of the rotating mechanism. The main rod 400 and the branch rods 410 and 420 are rotatable about the fulcrum 440, and the other end of the main rod 400 is pivotally coupled to the push rod 702. The main rod 400 and two branch rods 410 and 420 form a fork shape, and the driving gear 60 is disposed in an opening space between the two branch rods 410 and 420. Therefore, when the push rod 702 of the clutch device 70 is moved rightwards by the solenoid 700 so that the configuration of the clutch device 70 is changed from the one shown in FIG. 3A to the one shown in FIG. 3B, the push rod 702 transmits the main rod 400 to pivot about the fulcrum 440. As a result, a coupling state of the linkage mechanism is changed from a state that the left branch rod 410 urges the driving gear 60 up to a first specific position (FIG. 3A) to a state that the right branch rod 420 urges the driving gear 60 up to a second specific position (FIG. 3B).

The driving gear 60 at the first specific position (FIG. 3A) can engage with the gear 240a of the timing belt pulley 240 of the first transmitting module 201, as shown in FIG. 2A. Under this circumstance, when the driving motor 50 drives the driving gear 60 to rotate via the shaft 510 coupled therebetween, the rotation of the driving gear 60 transmits the gear 240a to rotate. Meanwhile, the gear 240c of the timing belt pulley 240, the timing belt 220, and the gear 105c of the timing belt pulley 105 are transmitted to rotate. Since the blocker 105b is integrated with both the gear 105c and the camera 100 as described above, the camera 100 can rotate with the driving gear 60 via the first transmitting module 201. Furthermore, since the blocker 105a is integrated with the blocker 105b and rotatably coupled to the post 1101 of the stand 110 as mentioned above, the camera 100 can rotate relative to the stand 110 in the vertical direction V.

The driving gear 60 at the second specific position (FIG. 3B) can engage with the gear 320. While the driving motor 50 is controlled to drive the driving gear 60 to rotate via the transmitting shaft 510, the driving gear 60 drives the gear 320 (FIG. 2C) to rotate. The gear 330 thus synchronously rotate with the gear 320, and transmit rotation of the seat 120 by way of the timing rack 350. With the rotation of the seat 120, the camera 100 rotates in the horizontal direction H.

It is to be noted that the linkage mechanism implemented with the fork-shaped rods and the fixed fulcrum as described above is for illustration only, and any other suitable means for changing the positions of the driving gear in response to the configuration change of the clutch device can be used to switch the rotation modes of the camera according to the disclosure of the present invention.

It is understood from the above descriptions that by way of cooperation of the clutch device 70 and the linkage mechanism to dispose the driving gear 60 at different locations, the driving gear 60 may engage with either one of the first transmitting module 201 and the second transmitting module 202, which are rotatable about non-parallel axes. Accordingly, the camera 100 can be selectively rotated, for example, in either the vertical direction or the horizontal direction, by the single motor 50. The linkage mechanism can thus be considered as a part of the clutch mechanism.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rotating mechanism for orienting an object in multiple directions, comprising:
   a motor;
   a driving gear coupled to and driven by the motor via a transmitting shaft;
   a first transmission module including a first input gear, which is selectively engaged with and transmitted by the driving gear to rotate when the driving gear is disposed at a first position, and transmitting the object to rotate in a first direction with rotation of the first input gear;
   a second transmission module including a second input gear, which is selectively engaged with and transmitted by the driving gear to rotate when the driving gear is disposed at a second position, and transmitting the object to rotate in a second direction with rotation of the second input gear; and
   a clutch mechanism including a clutch device for driving the driving gear to switch between the first position and the second position, the clutch device including a solenoid and a push rod movably disposed inside the solenoid, wherein when the solenoid is actuated, the push rod is moved outwards to urge the driving gear to the first position.

2. The rotating mechanism according to claim 1, wherein the driving gear disengages from the first input gear when moving from the first position to the second position, and the driving gear disengages from the second input gear when moving from the second position to the first position.

3. The rotating mechanism according to claim 2, wherein the clutch mechanism further includes a spring, which is attached to the transmitting shaft, compressed by the driving gear when the driving gear is moved to the first position by the clutch device, and urging the driving gear back to the second position when the driving gear is released by the clutch device.

4. The rotating mechanism according to claim 3, wherein the spring is a wire spring.

5. The rotating mechanism according to claim 3, wherein the spring is a leaf spring.

6. The rotating mechanism according to claim 1, wherein the first transmission module includes a timing belt, a first timing belt pulley, which engages with the timing belt at one location and includes the first input gear, and a second timing belt pulley, which engages with the timing belt at another location and rotatably coupled to the object.

7. The rotating mechanism according to claim 1, wherein the second transmission module includes the second input gear and a bevel gear set coupled to a seat for supporting the object, and the object is rotatable with the seat in the second direction when the driving gear is switched to the second position to engage with and transmitting the second input gear to rotate via the bevel gear set.

8. An image-capturing device for capturing images in a variety of fields, comprising a camera and a rotating mechanism as recited in claim 1, wherein the object is the camera.

9. The rotating mechanism according to claim 2, wherein the clutch mechanism further includes a linkage mechanism, which includes a main rod, two branch rods connected to one end of the main rod, and a fixed fulcrum, the main rod and the branch rods are rotatable about the fulcrum, and the other end of the main rod is pivotally coupled to the push rod.

10. The rotating mechanism according to claim 9, wherein the main rod and two branch rods form a fork shape, the driving gear is disposed in an opening space between the two branch rods, and the push rod is transmitted by the solenoid to transmit the main rod to pivot about the fulcrum, thereby switching the driving gear between the first position and the second position.

11. The rotating mechanism according to claim 2, wherein the clutch mechanism further provides a magnetic force to move the driving gear from the first position back to the second position.

\* \* \* \* \*